United States Patent [19]

Kasravi

[11] Patent Number: 5,055,049

[45] Date of Patent: Oct. 8, 1991

[54] WORD LISTING SYSTEM

[76] Inventor: Peter B. Kasravi, 429 Hot Spring Rd., Santa Barbara, Calif. 93108

[21] Appl. No.: 472,430

[22] Filed: Jan. 25, 1990

[51] Int. Cl.$^5$ .............................................. G09B 19/00
[52] U.S. Cl. .................................. 434/156; 273/272; 434/177
[58] Field of Search ............... 273/148 R, 153 R, 272; 434/156, 167, 177, 157, 172; 364/900

[56] References Cited

U.S. PATENT DOCUMENTS

| | | | |
|---|---|---|---|
| 2,848,824 | 8/1958 | Donaldson . | |
| 4,227,697 | 10/1980 | Castanis | 273/272 |
| 4,456,969 | 6/1984 | Herzik et al. | 364/900 X |
| 4,503,514 | 3/1985 | Urquhart | 364/900 |
| 4,655,620 | 4/1987 | Adams et al. | 364/900 X |
| 4,703,425 | 10/1987 | Muraki | 434/156 X |
| 4,807,905 | 2/1989 | Reagan | 434/156 X |

Primary Examiner—Richard J. Apley
Assistant Examiner—Glenn E. Richman
Attorney, Agent, or Firm—Harlan P. Huebner

[57] ABSTRACT

A word listing system adapted to be complied into an electronic or print dictionary or compendium wherein the words are arranged in columns. There is a vertical guide column which indexes words arranged horizontally in said columns by corresponding letters alphabetically arranged therein. Said words may extend horizontally on either side of said column, end or begin with the letter in said guide columns. Each word in said list is reproduced at least twice in said compendium.

8 Claims, 3 Drawing Sheets

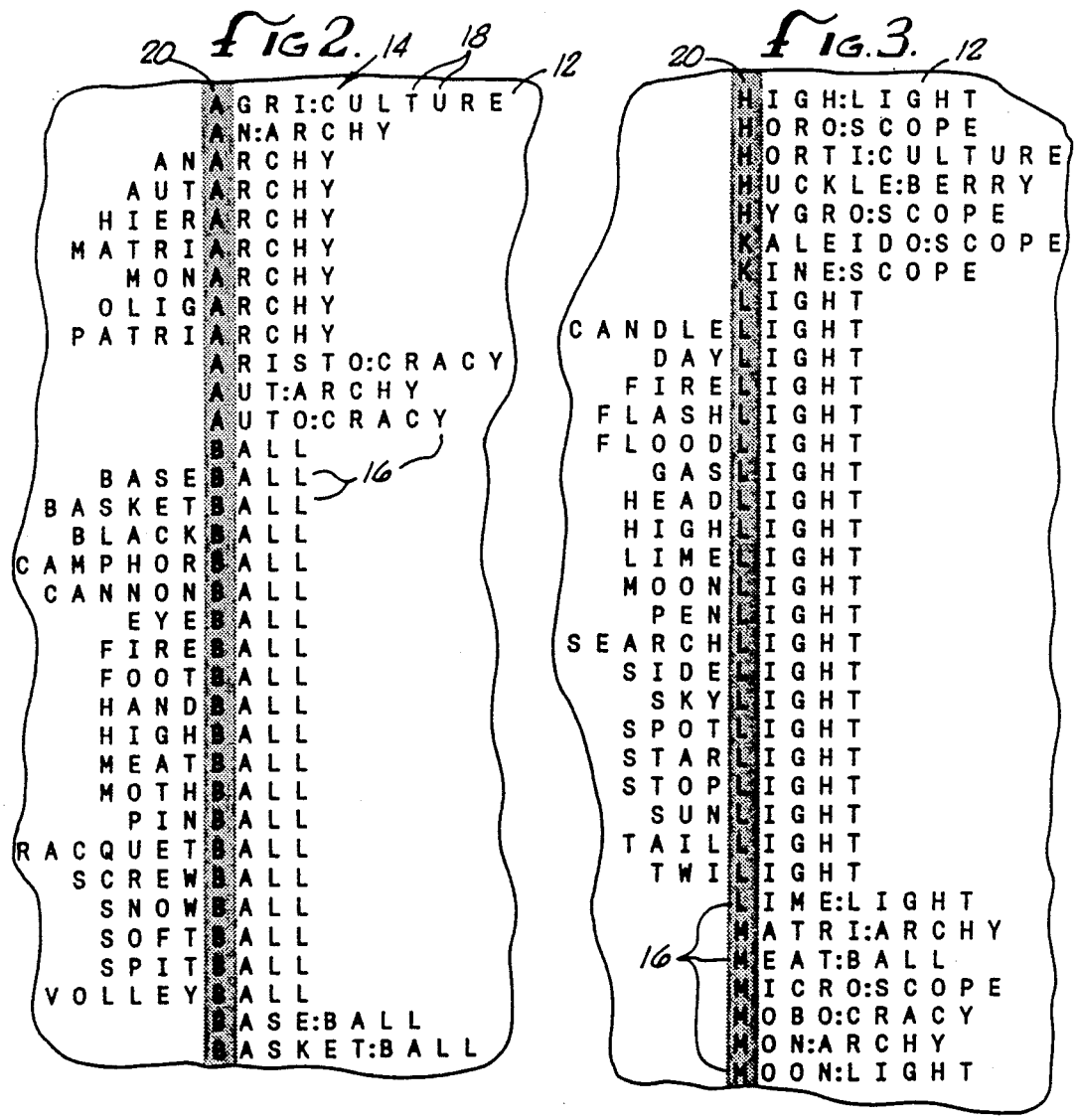
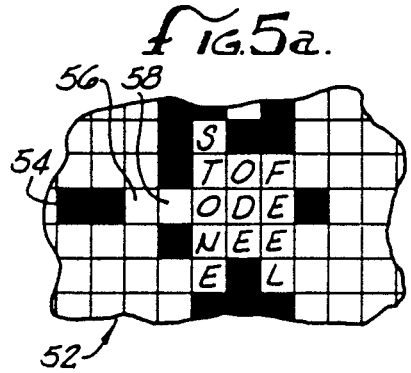
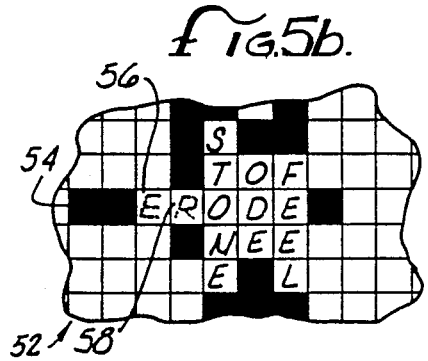

WORD LISTING SYSTEM

BACKGROUND OF THE INVENTION

1. Field of the Invention

This invention relates to a word listing system and particularly a spelling dictionary and character list arrangement.

2. Description of the Prior Art

All presently known dictionaries used for looking up the spelling of a word and/or the definition of a word are arranged alphabetically commencing with the first letter of the word and that word appears only once in the dictionary. Heretofore, the first letter of the word has been the key. As an illustration "atom" is listed under "a" but only once in the dictionary. Traditional dictionaries are still necessary and of course serve a useful purpose. However, there are situations such as encountered by cross-word puzzle users where there may be several spaces and two or more letters are juxtaposed without the initial letter or other help for the word. In such a situation a regular dictionary is not helpful or useful.

In addition, if a person is merely interested in looking up the spelling of a word and is unsure of internal letters or letter arrangements in the word for the correct spelling the conventional dictionary is not very helpful. While the word and correct spelling may eventually be located valuable time is wasted in the traditional hunting method.

Applicant is only aware of one device that can be used to assist a person in working a cross word puzzle and that is a word forming device described in U.S. Pat. No. 2,848,824 issued to J. W. Donaldson on Aug. 26, 1958. This patent however has shortcomings as it requires moving rods with the alphabet on them up and down to register in openings. The problem with this device is that it is not truly geared for use with crossword puzzles and utilizes a "hit or miss" technique.

SUMMARY OF THE INVENTION

It is the purpose of the present invention to provide a word or character listing system in which there are character or letter columnar arrangements as to present in a guide column a character or letter and juxtaposed letters of a word no matter the initial letter of the word.

Another object of the present invention is to provide a number of preselected words in any language that utilize alphabet characters in a listing wherein each entry so selected is cross references by each character in the entry in a guide column.

A still further object of the present invention is to follow the alphabet from "a" to "z" in listings, but to classify and arrange the selected words so that the letter of the alphabet being arranged may fall anywhere in the word.

Another object of the present invention is to utilize along with the columnar arrangement of the preselected entries, symbols positioned adjacent characters of a word to denote peculiarities of the word such as a common ending with other words or silent initial consonants.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIG. 2 is an enlarged columnar listing of words in the dictionary wherein an alphabetized listing of highlighted letters in alphabetized words is displayed in a guide column beginning with the letter "A";

FIG. 3 is a similar columnar listing as in FIG. 2 wherein the highlighted letters begin with the letter "H";

FIG. 5a is a representation of a partial cross word puzzle for which the dictionary may be used;

FIG. 5b is the same as FIG. 5a but with the word in question now completed.

DETAILED DESCRIPTION OF THE PREFERRED EMBODIMENT

Figure 1:
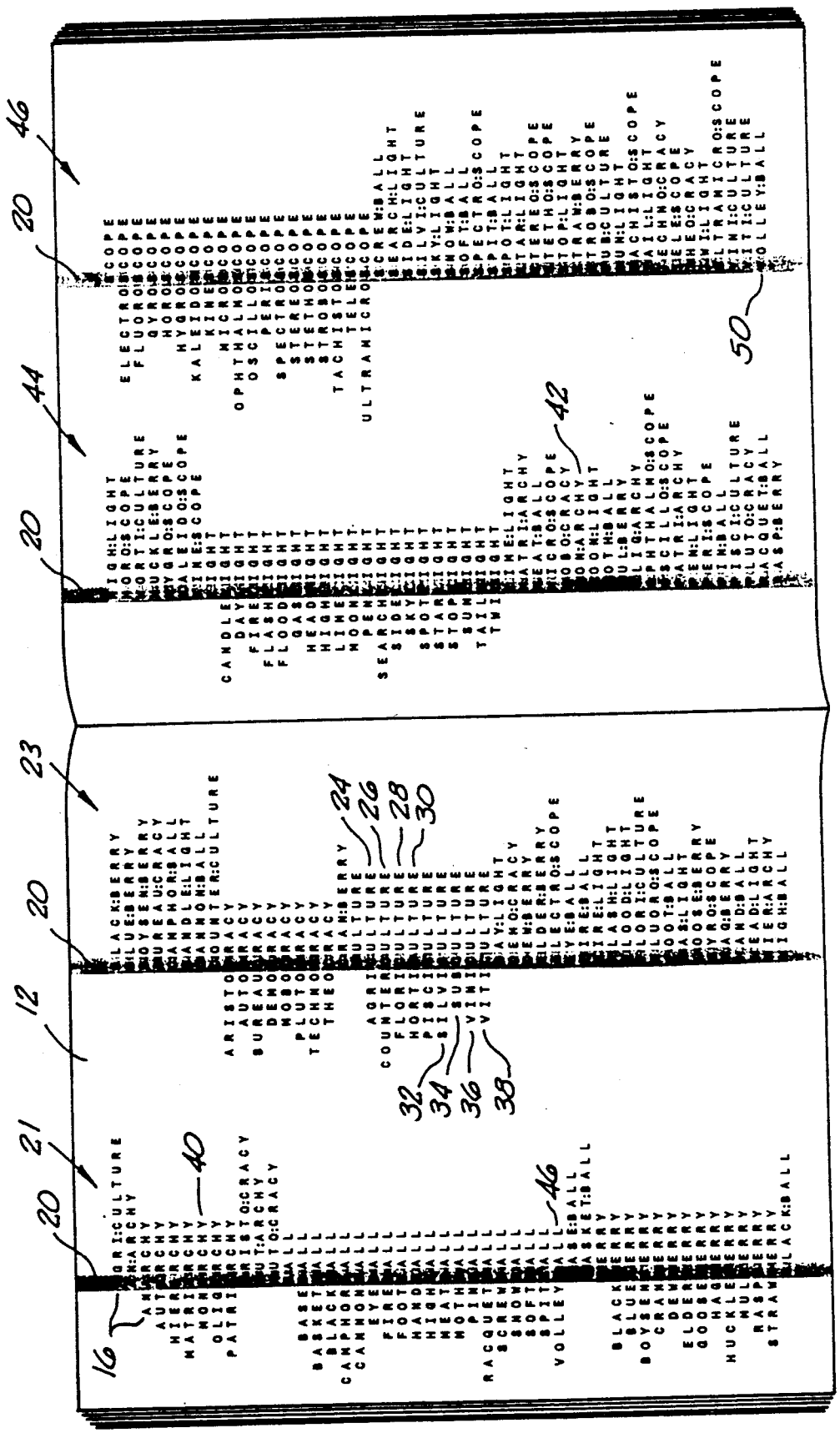
FIG. 1 is page representations of the new word listing system in a dictionary or book form.
Figure 4A:
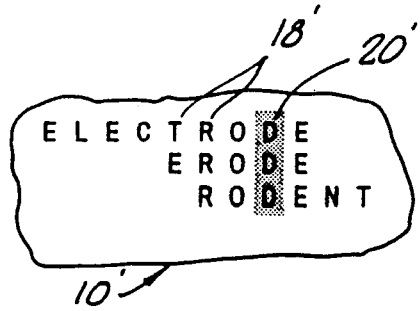
FIGS. 4a–4d are representations of four listings of one word, i.e. "erode" in the dictionary where each letter of the word falls in the guide column.
Figure 4B:
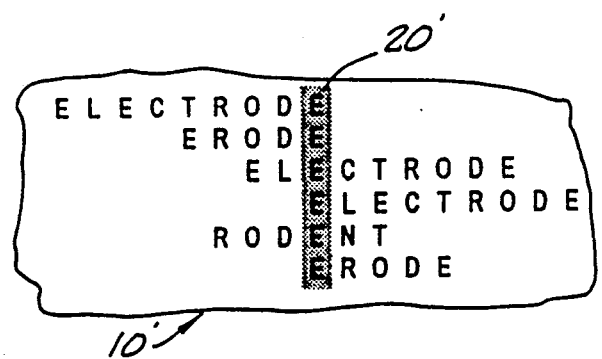
Figure 4C:
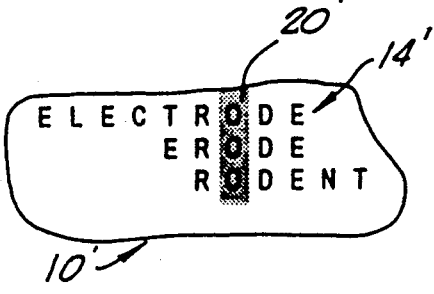
Figure 4D:
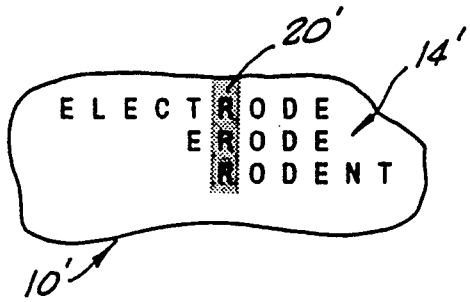

FIG. 1 illustrates a dictionary generally designated 10 which includes a number of pages 12 forming the dictionary 10.

Produced on each page 12 of the dictionary 10 are columns designated 14 of words 16. Each column 14 is formed of the words 16. As can be seen from the drawings each word 16 is arranged under the next and the characters or letters 18 are arranged in vertical columns.

Each column 14 has what is termed as a guide or indexing column 20. In the particular illustrations of FIGS. 1 through 4b that is the highlighted column which in FIG. 2 contains the letter "A" and "B". In FIG. 3 the highlighted column contains letter "H" through "M". It is immaterial how the guide or indexing column 20 is presented. It could be accomplished by bold facing the letter or character 18 therein, underlining the letter or character 18 therein, or placing a character such as a colon before the letter of character 18 without departing from the spirit of the invention.

In the case of a dictionary 10 of English words the compiler will select all of the words that are desired for listing in the dictionary. It could be any number depending upon the size and completeness of the dictionary.

After the total words from "A" through "Z" are selected the appropriate column 14 listings are undertaken to accomplish the word listing system.

For sake of illustration in FIG. 2 the compiler has selected two words that begin with "a", they are "agriculture" and "anarchy."

In view of the fact that the guide column 20 is alphabetized then "A" becomes the first letter in the guide column 20 and as the two above written words begin with "A" they are listed first in alphabetical order. In the case of "agriculture" and "anarchy" each letter appears to the right of the "a" guide column. With regard to both of those words it will be noted that each word is divided by a segment guide 22. The segment guide 22 is preferably a colon. The purpose of the segment guide 22 is to visually call attention to a portion of the word to the right of the segment guide 22 so that the user of the dictionary 10 will look at the first letter that follows in the case of "agriculture" it is "c" That letter then should be consulted in the guide column 20. Attention is directed to FIG. 1 where "culture" appears in the first column 21 to the right of the colon 22 and the word "agriculture" is found in the second column 23 item number 24.

At the same time the user may review all of the words that have "culture" in them, see FIG. 1, column 23. As can be seen they are items 26 through 38 ending with "viticulture."

Now returning to the guide column 20 of "A", FIG. 1, other words are then listed below "Anarchy" see FIG. 2. These words have the vowel "A" somewhere therein. These words are arranged in alphabetical order on the letter 18 to the right of the guide column 20 letter.

The process is then repeated where the guide column 20 is a "B" and so forth through the alphabet.

Now referring again to the dictionary 10 in FIG. 1 the inventor contemplates two general types of the dictionary. One is known as the concise edition which is illustrated in FIG. 1. In this edition a word such as "agriculture" is only listed twice. Once in the left column 21 at the top as the first word and secondly in the right column 23 as item 24. This is because within the total word there is a sub segment or word "culture", which is a common segment with other words. By noting the segment guide 22 of the word under the "A" guide column 21 it will acknowledge the word is listed twice and there are other sub segment words with it, items 26 through 38.

On the other hand in the concise edition of FIG. 1 a word such as "monarchy" item 40 in the left column 21 will appear a second time at 42 under its first letter "M" of the third column 44. Another illustration is "volleyball" item 46 in the first column 21 and again it appears in the fourth column 46 as item 50.

The second type of dictionary 10 which is characterized as a universal type includes, as illustrated in FIG. 4a through 4d, additional listings for each word. Here every letter 18, of each word is listed in the guide column 20, In the illustrations of FIGS. 4a through 4d the word is "erode". Therefore, under the universal dictionary 10, "erode" is listed five times in the guide column 20, under "D", "E" (as a start letter), "E" (as an end letter), "O" and "R".

One of the important uses of the dictionary and word listing system 10 relates to working cross word puzzles.

In FIG. 5a there is illustrated a partial cross word puzzle designated 52. The puzzle 52 includes a number of horizontal and vertical line boxes. As an illustration assume that on horizontal line 54 there are two empty spaces 56 and 58 followed by the letters "O", "D" and "E" and the entire word is not known from the definition given.

The cross word puzzle worker would refer to the dictionary 10 or 10' for assistance. The usual procedure would be to consult the "O" guide or indexing column 20 or 20' such as specifically illustrated in FIG. 4c and read down the column 14' until a word is located ending in "ode" and having two letters preceding the "ode". In the present illustration there is only one word that would fit the space and that is "erode". Thus the puzzle could be completed as seen in FIG. 5b with the addition of letters "E" and "R" (shown in phantom lines) in the spaces 56 and 58.

With either the concise or universal dictionary 10 or 10, respectively it can be seen that the alphabetical listing system adds a new dimension to word listings giving many more opportunities for verification of word spelling, cross word puzzle use and lexicography.

When using the universal dictionary 10' it can be seen that every part of every entry is equally represented and accessible in the new system arrangement. Every word or character is cross referenced and any entry may be located by looking up any portion of the word.

While the system has been expressed herein in English it should be realized that any other language would be adapted to the new alphabetical listing without departing from the spirit of the invention.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A word listing system wherein each word therein is located in more than one place in said listing, said system including:

a plurality of vertical columns of words, wherein each word is arranged on a horizontal plane and each letter of each word is arranged in vertical character rows and each row is vertically arranged whereby one character may be above another;

a vertical aligned guide column for each plurality of vertical columns of words, said guide column includes the same letter of each word successively displayed in said column no matter where in the horizontal word listed that particular letter appears, wherein said letters appearing in said guide column are alphabetically arranged and additional letters of said horizontal word may appear on either side of said guide column.

2. A word listing system as defined in claim 1 wherein said vertical aligned guide columns each include:

visual means to designate said columns over any other vertical columns of letters.

3. A word listing system as defined in claim 2 wherein said visual means includes:

highlighting said guide columns.

4. A word listing system as defined in claim 2 wherein said visual means includes:

underlining said letters in said guide columns.

5. A word listing system as defined in claim 1 wherein:

each word of said listing in said vertical columns will appear in said columns as many times as the number of letters in said word, and said multiple listings will be alphabetical dependant upon which letter is being placed in said guide column and the letters adjacent to said letter in said guide column will shift relative to said guide column correspondingly.

6. A word listing system as defined in claim 1 wherein:

a visual segment guide is placed between letters of a word in said listing, other than in said guide column, to designate a segment of said word, which segment guide designates to the right thereof and word segment which is a common segment with other words and will appear elsewhere in said listing.

7. A word listing system as defined in claim 6 wherein:

said visual segment guide is a colon.

8. A word listing system as defined in claim 1 wherein:

said word is listed twice in said listing, wherein said initial letter of said word is located in the vertical guide column and a second listing places the first letter of any segment of said word that is a recognized segment in said vertical guide column.

* * * * *